March 24, 1953 J. H. PENNER 2,632,565
SELF-CLOSING SEDIMENT BOWL
Filed Nov. 7, 1949
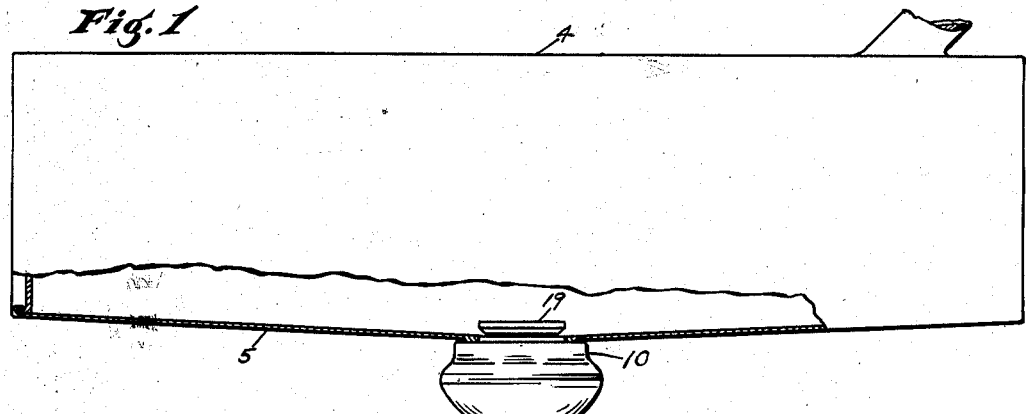
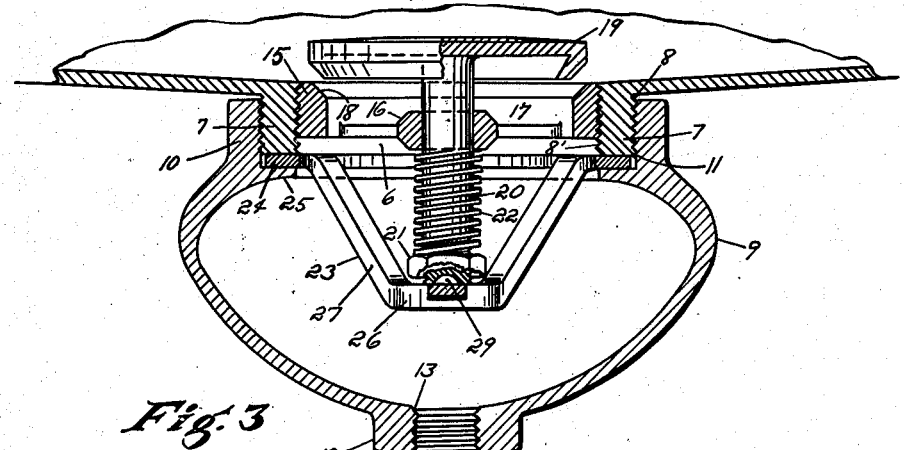
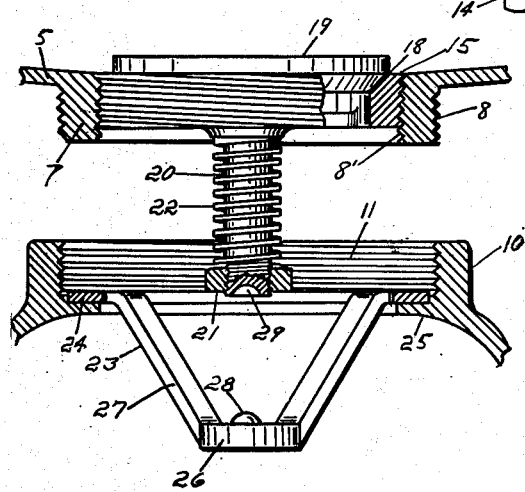
INVENTOR-
Julius H. Penner
Harry D. Kilgore
Attorney Patented Mar. 24, 1953

2,632,565

UNITED STATES PATENT OFFICE 2,632,565

SELF-CLOSING SEDIMENT BOWL

Julius H. Penner, Minneapolis, Minn.

Application November 7, 1949, Serial No. 126,023

1 Claim. (Cl. 210—57)

My invention relates to improvements in sediment bowls for fluid tanks and especially is well adapted for embodiment in gasoline tanks for automotive vehicles.

The principal object of this invention is to provide a novel sediment bowl for collecting water, dirt and other foreign matter from fluid tanks.

Another object of this invention is to provide a novel sediment bowl for fluid tanks from which collected foreign matter cannot splash back into the tank.

Still another object of this invention is to provide a novel sediment bowl that can be drained or removed from the tank for the purpose of emptying and cleansing the same without having to drain the tank.

A further object of this invention is to provide a fluid tank having a novel adjustable sediment bowl and a port in communication with the bowl, a valve for closing the port, and means controlled by the bowl for normally and positively holding the valve open and permitting the valve to close by partially removing the bowl from the tank.

Other objects of the invention will be apparent from the following description, reference being had to the drawing.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is a front elevational view of a gasoline tank having the invention embodied therein;

Fig. 2 is a view, on an enlarged scale, of the sediment bowl principally in central vertical section and also showing a fragment of the gasoline tank in section; and Fig. 3 is a view corresponding to Fig. 2, with the exception that the bowl is shown fragmentarily and detached from the tank and the valve closed.

The numeral 4 indicates a rectangular tank of the type commonly used for automotive vehicles. In the bottom member 5 of the tank 4 at the center thereof is a port 6 and said bottom member slopes to drain through this port 6. Integral with the bottom member 5 on the under side thereof is a depending flange 7 having external screw threads 8 and internal screw threads 8'.

A sediment bowl 9, in the form of substantially a half sphere, has a neck portion 10 provided with internal screw threads 11 that have threaded engagement with the external screw threads 8 and detachably attach the bowl 9 to the tank 4. Integral with the bottom of the bowl 9, at the center thereof, is an external hexagonal boss 12 for the application of a wrench to turn said bowl for the purpose of screwing the same onto the flange 7 or for unscrewing the same therefrom. Formed in the bottom of the bowl 9 and the hexagon boss 12 is a drain hole 13 normally closed by a screw plug 14.

An annular bushing 15 in the port 6 has threaded engagement with the internal screw threads 8' thereof. In the center of the bushing 15, in axial alignment therewith, is a hub 16 having radial arms 17 integral with said bushing. This bushing 15 has on its upper end a valve seat 18 for a valve 19. This valve 19 has a depending valve stem 20 that extends through the hub 16. A nut 21 has screw-threaded engagement with the lower end portion of the valve stem 20. Encircling the valve stem 20 is a coiled spring 22 compressed between the hub 16 and the nut 21. This spring 22 is under strain to close the valve 19 and, in turn, close the port 6. The tension of the spring 22 may be varied, at will, by adjusting the nut 21 on the valve stem 20.

The valve 19 is normally held open by a spider 23 so that water, dirt and other foreign matter in the fluid in the tank 4 will be precipitated into the sediment bowl 9. This spider 23 has an annular member 24 that loosely rests on an internal annular flange 25 integral with the bowl 9 at the junction of its neck portion 10. The spider 23 also has a central underslung portion 26 having upwardly and outwardly inclined radial arms 27 integral with the annular member 24. This annular member 24 is normally held clamped between the lower end of the flange 7 and the annular flange 25.

At the time the bowl 9 is being screwed onto the flange 7, the central portion 26 of the spider 23 engages the valve stem 20, at its lower end, and lifts the same to open the valve 19 against the tension of the spring 22. To align the valve stem 20 and hold the same against lateral movement during the raising and lowering of the valve 19 by the spider 23, there is formed on the central portion of said spider a half ball 28 that extends into a socket 29 in the lower end of the valve stem 20.

To drain the tank 4 and the sediment bowl 9, it is only necessary to remove the screw plug 14. To drain the sediment bowl 9 without draining the tank 4, said bowl is partially unscrewed sufficiently to lower the spider 23 out of contact with the valve stem 20 and thus permit the spring 22 to close the valve 19 and then remove the screw plug 14. If it is desirable to empty and cleanse the bowl 9, the same may be entirely removed from the tank 4. In replacing the bowl 9, it is screwed onto the flange 7 sufficiently to close the bowl 9 before the spider 23 engages the valve stem 20 to open the valve 19.

The internal diameter of the bowl 9, at the top thereof, is materially larger than the diameter of the port 6 and the novel internal shape of said bowl at the upper portion thereof prevents fluid in the bowl 9 from splashing into the tank 4 through the open port 6.

The drawing illustrates a commercial form of the invention, but it will be understood that the same is capable of certain modifications as to details of construction, arrangement and combination of parts within the scope of the invention herein disclosed.

What I claim is:

A tank having in its bottom a port and a depending annular member surrounding said port and provided with external and internal screw threads, a bowl provided with an upstanding annular neck having threaded engagement with the external screw threads on said member, said neck having on its lower end an internal annular flange extending under said member, the internal wall of the bowl being outwardly, downwardly and inwardly curved from the under side of the flange, a horizontal ring resting on the flange and held by the neck from moving in the plane of the ring, said ring normally held by the flange pressed against the lower end of said member, an annular bushing having threaded engagement with the internal screw thread on said member and having an annular valve seat and an upper spider comprising a hub and radial arms, said ring having a lower spider comprising a central member and downwardly converging arms, the central member of the lower spider having a half ball in axial alignment with said hub, an annular valve constructed and arranged to engage the valve seat and close the port, said valve having a depending stem extending through the hub with its lower end engaging the central member of the lower spider and normally holding the valve open, said valve stem having in its lower end a socket into which the half ball extends, and a coiled spring encircling the valve stem with its lower end held relative thereto and with its upper end engaging the hub as a base of resistance and under strain to close the valve as the ring and its spider are being lowered on the flange and before the unscrewing of the bowl from said member is completed.

JULIUS H. PENNER.

REFERENCES CITED

The following references are of record in the file of this patent:

UNITED STATES PATENTS

| Number | Name | Date |
|---|---|---|
| 1,446,056 | Misener | Feb. 20, 1923 |
| 1,720,380 | Schulze | July 9, 1929 |
| 1,828,040 | Hahn | Oct. 20, 1931 |
| 1,933,409 | Berman | Oct. 31, 1933 |